United States Patent [19]

Carroll et al.

[11] 4,281,816
[45] Aug. 4, 1981

[54] AUTOMATIC APPARATUS FOR MOLDING A PREFORM

[75] Inventors: Charles B. Carroll, Trenton; Frederick C. Schaller, Lincroft; Ernest A. Beres, Robbinsville, all of N.J.

[73] Assignee: RCA Corporation, New York, N.Y.

[21] Appl. No.: 102,620

[22] Filed: Dec. 11, 1979

[51] Int. Cl.³ .................. B29D 17/00; B29F 1/022
[52] U.S. Cl. .................................. 249/82; 425/406; 425/411; 425/810; 425/589; 425/542; 264/107
[58] Field of Search ............... 425/116, 810, 501, 511, 425/215, 123, 542, 406; 264/107; 249/82

[56] References Cited

U.S. PATENT DOCUMENTS

| | | |
|---|---|---|
| 2,743,478 | 5/1956 | Harlow et al. |
| 3,023,458 | 3/1962 | Seymour |
| 3,412,427 | 11/1968 | Flusfeder et al. |
| 3,663,136 | 5/1972 | Westermann ........................ 425/116 |
| 3,702,749 | 11/1972 | Flusfeder et al. ..................... 425/810 |
| 3,776,989 | 12/1973 | Annis et al. |
| 3,862,815 | 1/1975 | Roczynski et al. .................... 425/116 |
| 3,932,087 | 1/1976 | Nilsson et al. ....................... 425/810 |
| 4,005,965 | 2/1977 | Roczynski et al. .................... 425/810 |

*Primary Examiner*—J. Howard Flint, Jr.

*Attorney, Agent, or Firm*—Birgit E. Morris; Donald S. Cohen

[57] ABSTRACT

A preform molding apparatus includes a mold cup which has opposed top and bottom mold members and a carrier arm between the mold members. The top mold member has a concave mold recess in its bottom surface and a semi-cylindrical rim extending downwardly from the edge of the mold recess. The bottom mold member has a concave mold recess in its top surface and a mold material inlet opening into the bottom of the mold recess. The carrier arm has a semi-cylindrical opening therethrough at one edge thereof. Pneumatic cylinders have piston rods connected to the mold members and the carrier arm for moving the mold members toward and away from each other and the carrier arm transversely across and away from the mold members. The mold members and carrier arm are adapted to be moved to a collapsed mold position in which the bottom mold member fits within the rim of the top mold member and the top mold member is within the opening in the carrier arm so that the mold recesses form a mold cavity smaller in volume than that of the preform to be molded. The mold members are movable to a mold position where the carrier arm and top mold member rim form the outer wall of the mold cavity so that the mold cavity is of a volume corresponding to that of the preform being molded.

13 Claims, 6 Drawing Figures

4,281,816

AUTOMATIC APPARATUS FOR MOLDING A PREFORM

BACKGROUND OF THE INVENTION

The present invention relates to an apparatus for molding a preform which is used in making an information recording disc, and particularly to such an apparatus which provides for automatic transfer of the preform from a molding cup to a disc molding press.

Compression molded recorded discs are generally made by forming a preform of thermoplastic material and placing the preform centrally between a pair of heated molds. The molds are closed against the preform, melting the thermoplastic and compressing it, causing it to flow outwardly to fill the mold cavity and define the record contour. In molding the discs it is highly desirable to prevent, or at least minimize, surface defects, such as voids caused by trapped air and gasses, which can disrupt the grooves in the surface of the disc. The prevention of such surface defects is more desirable in making high density information discs, such as video discs, which utilize packing densities of the order of 10,000 grooves per inch, since even the smallest void can disrupt a large number of the grooves.

The preforms used to mold the discs are generally formed at the molding machine in a cup-shaped mold, generally referred to as a "cup". The heated plastic material is injected into the cup through an opening in the side of the cup until the cup is filled with the plastic. When the heated plastic is injected into the cup it extrudes in a snake-like fashion across the interior of the cup and then swirls around in the cup until the cup is filled. This results in a non-uniform temperature distribution across the plastic material which, along with the swirling action, can result in air and gasses being trapped in the preform and in variations in density of the preform. The trapped air and gasses and the variation in density can result in defects in the recorded disc formed from the preform. In addition, the side injection of the plastic into the cup can result in decomposition of the molding composition due to shear, particularly at the edge of the preform adjacent to the injection opening in the cup. This also can adversely affect the quality of the record made from the preform.

To form a preform in which the above defects are eliminated or at least minimized, there has been developed a mold cup having a pair of mold members, one of which can fit inside the mold cavity of the other and wherein the plastic material inlet opening is in the bottom of one of the mold members. To mold a preform in this mold cup, the two mold members are moved together until one fits inside the other and the volume defined by the cavities in the mold members is considerably smaller than that of the desired preform. The plastic material is injected into the reduced volume of the mold cavities until they are filled. Continued injection of the plastic material causes the upper mold member to move away until the desired volume of the mold cavity is achieved. That volume is determined by a preset control which shuts off the flow of the plastic into the mold cavity. The density and shape of the preform is controlled by a force exerted upon the upper mold member which is less than, and which opposes, the force of the incoming plastic material. The mold members are then separated to permit removal of the preform. To mold records in an automatic molding press it is desirable to have a mold cup which performs in the above manner but which also provides for automatic transfer of the preform from the mold cup to the record mold press.

SUMMARY OF THE INVENTION

A preform mold cup includes a pair of mold members mounted with a surface of each opposing a surface of the other. Each of the mold members has a concave mold recess in its opposed surface. A carrier arm is mounted between the mold members and is adapted to form with the mold recesses in the mold members, a mold cavity. The mold members are adapted to fit within the carrier arm to form a mold cavity smaller in volume than that of the preform to be molded. A molding material inlet opens into the recess in one of the mold members at the bottom of the recess. The mold members are adapted to move toward and away from each other and the carrier arm is adapted to move transversely across the mold members to carry a molded preform from between the mold members to an adjacent mold press.

DETAILED DESCRIPTION OF THE INVENTION

Figure 1:
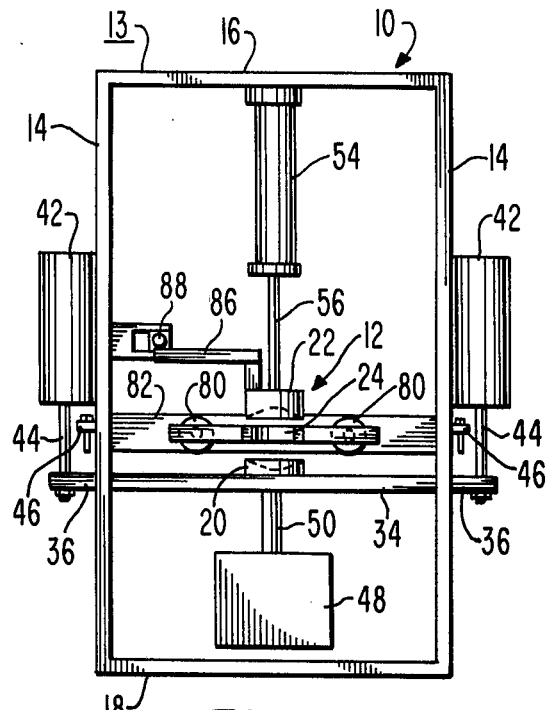
FIG. 1 is a front elevational view of an apparatus incorporating the mold cup of the present invention.

Referring to FIG. 1, there is shown a molding apparatus, generally designated as 10, which incorporates the mold cup, generally designated as 12. The molding apparatus 10 includes a support frame 13 having vertical side rails 14 connected together at their ends by horizontal top and bottom rails 16 and 18. The mold cup 12 includes a bottom mold member 20, a top mold member 22 and a carrier arm 24 between the bottom and top mold members 20 and 22.

Figure 3:
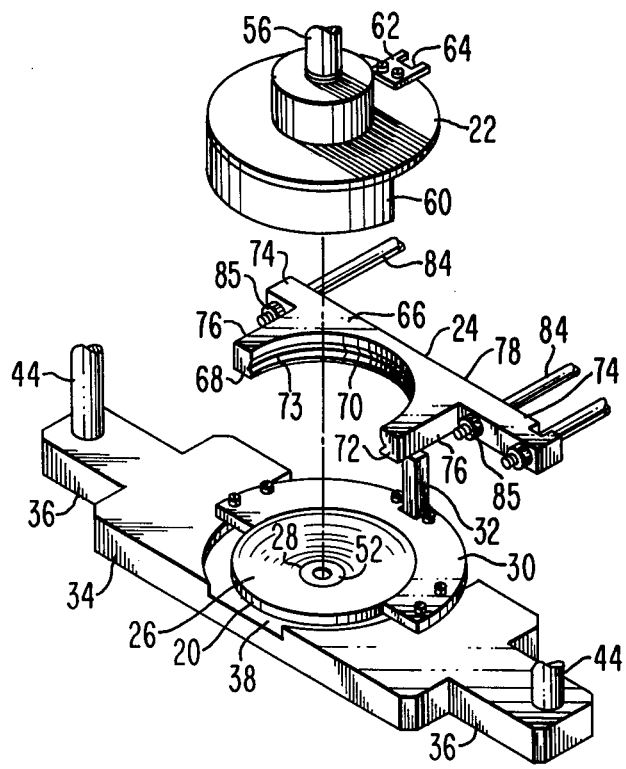
FIG. 3 is an exploded perspective view of the mold cup of the present invention.
Figure 4:
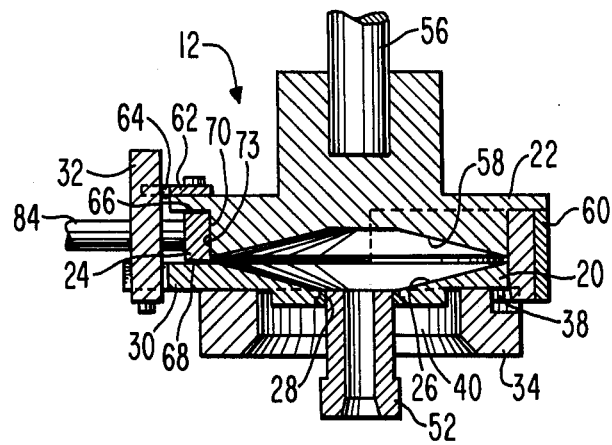
FIG. 4 is a sectional view through the mold cup of the present invention in its completely closed position.

As shown in FIG. 3, the bottom mold member 20 is a circular plate having a concave mold recess 26 in its top surface and an opening 28 through the center thereof at the bottom of the recess 26. A rim 30 extends radially outwardly from the edge of the mold recess 26 around about one-half of the periphery of the bottom mold member 20. A guide pin 32 extends upwardly from the rim 30 at the periphery thereof. The bottom mold member 20 is mounted on a support plate 34 which, as shown in FIG. 1, extends horizontally between the side rails 14 of the support frame 13. The support plate 34 has arms 36 extending from its ends and projecting through openings in the side rails 14. The support plate 34 has a groove 38 in its top surface which extends around the periphery of that portion of the bottom mold member 20 which has no rim. As shown in FIG. 4, the support plate 34 has an opening 40 therethrough to permit access to the opening 28 in the bottom mold member 20.

A separate pneumatic cylinder 42 is secured to each of the side rails 14 of the support frame 13 above the support plate 34. The cylinders 42 are vertically positioned and each has a piston rod 44 extending downwardly therefrom and connected at its end to a separate one of the arms 36 of the support plate 34. The pneumatic cylinders 42 are of the type which will normally pull the support plate 34 upwardly. On each of the side rails 14 above the support plate 34 is an adjustable stop 46 against which the arms 36 of the support plate 34 are held by the action of the pneumatic cylinders 42.

A plastic extruder 48 is mounted below the support plate 34 and has an exit pipe 50 extending upwardly toward the support plate 34. On the end of the exit pipe 50 is a nozzle 52 which, as shown in FIG. 4, extends through the opening 40 in the support plate 34 and has a slidable but true fit in the opening 28 in the bottom mold member 20.

A pneumatic cylinder 54 is secured at one end to the top rail 16 and extends vertically downwardly therefrom. A piston rod 56 extends vertically downward from the cylinder 54. The top mold member 22 is secured to the end of the piston rod 56. With reference now to FIG. 3, the top mold member 22 is circular and has a concave mold recess 58 in its bottom surface. A cylindrical rim 60 extends vertically downwardly from about one-half of the periphery of the mold recess 58. A guide arm 62 projects radially outwardly from the periphery of the top mold member 22 and has a notch 64 in its outer end which is adapted to receive the guide pin 32 which extends from the bottom mold member 20.

The carrier arm 24 is a substantially rectangular plate having flat top and bottom surfaces 66 and 68 respectively. A semi-cylindrical opening 70 extends through the carrier arm 24 between the top and bottom surfaces 66 and 68 with a diameter of the opening 70 being along the forward edge 72 of the carrier arm 24. The wall of the opening 70 has a shallow notch 73 therein. The radius of the opening 70 is equal to the radius of the inner surface of the cylindrical rim 60 of the top mold member 22. A pair of mounting arms 74 project from the side edges 76 of the carrier arm 24 and are aligned along the back edge 78 of the carrier arm.

Figure 2:
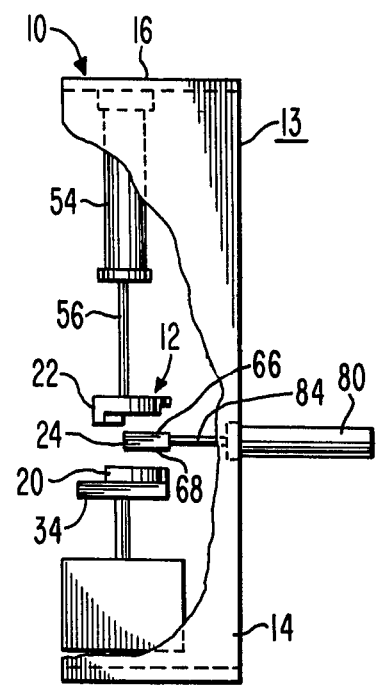
FIG. 2 is a side elevational view, partially broken away, of the apparatus shown in FIG. 1.

A pair of spaced, parallel pneumatic cylinders 80 are mounted on a support plate 82, which is mounted between the side rails 14 of the support frame 13 (see FIGS. 1 and 2). The pneumatic cylinders 80 extend along lines perpendicular to the pneumatic cylinder 54. Piston rods 84 extend from the cylinders 80 and the ends of the piston rods 84 extend through and are secure to the mounting arm 74 of the carrier arm 24 (see FIG. 3). Thus, the carrier arm 24 is supported on the piston rods 84 and is adapted to be moved by the piston rods 84 along a path between and transversely across the top and bottom mold members 22 and 20.

To mold a preform in the molding apparatus 10, the cylinders 42 are actuated to hold the support plate 34 upwardly against the stops 46. The stops are adjusted so that the bottom mold member 20 is positioned with the end of the nozzle 52 being flush with the bottom of the mold recess 26 and with the bottom mold member 20 being seated against the bottom surface 68 of the carrier arm 24. With the carrier arm 24 being over the bottom mold member 20 it is positioned by means of the screws 85 on the ends of the piston rods 84 so as to be flush with the rim 30 of the bottom mold member 20 and with the wall of the opening 70 coinciding with the periphery of the mold recess 26.

The pneumatic cylinder 54 is then actuated to lower the top mold member 22 onto the carrier arm 24 and the bottom mold member 20. The top mold member 22 is lowered until it is seated against the top surface 66 of the carrier arm 24 and the cylindrical rim 60 fits into the groove 38 in the support plate 34 and extends around the periphery of the bottom mold member 20 with the edge of the mold recess 58 being coincident with the edge of the mold recess 26 as shown in FIG. 4. In this collapsed position of the mold cup 12, the top mold member 22 is within the opening 70 in the carrier arm 24 and the bottom mold member 26 is within the cylindrical rim 60 of the top mold member 22. Also, the cavity formed by the mold recesses 26 and 58 is of a volume smaller than the volume of the preform being molded. The top mold member 22 is guided into its proper position on the carrier arm 24 and bottom mold member 20 by the guide pin 32 fitting in the notch 64 in the guide arm 62.

Figure 5:
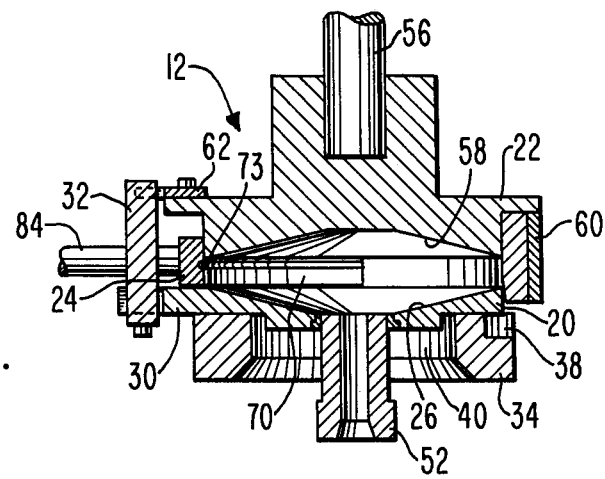
FIG. 5 is a sectional view of the mold cup in its final molding position.

With the mold cup 12 being in its collapsed position as shown in FIG. 4, the extruder 48 is turned on to extrude plastic material through the nozzle 52 into the cavity formed by the mold recesses 26 and 58. When the plastic material completely fills the mold cavity the pressure of the plastic material entering the mold cavity forces the top mold member 22 upwardly until the mold cavity is of a volume and shape of the preform being molded (the molding position) as shown in FIG. 5. As shown in FIG. 1, a flag 86 is mounted on the top mold member 22 and is positioned to extend across a proximity switch 88 mounted on a side rail 14. The flag 86 and proximity switch 88 are positioned such that when the top mold member 22 reaches the molding position, where the mold cavity is of the desired volume, the flag 86 extends across the switch 88 causing the switch to be actuated to turn off the extruder 48. As the top mold member 22 rises to the molding position the surface of the opening 70 in the carrier arm 24 is exposed to the interior of the mold cavity permitting the plastic material to enter and fill the notch 73.

Figure 6:
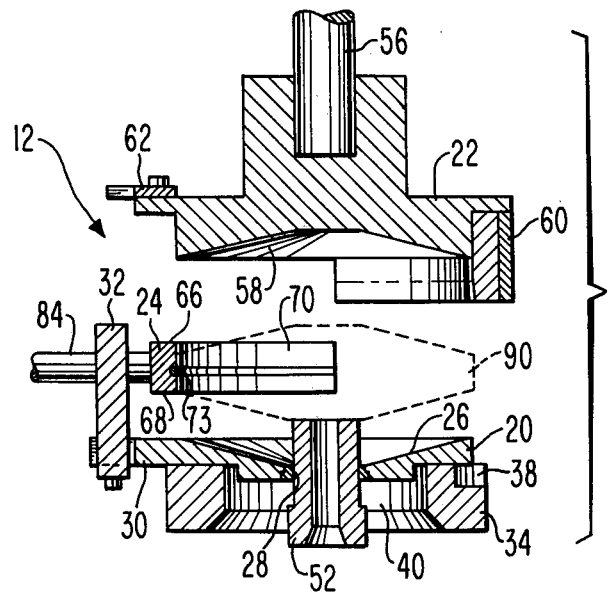
FIG. 6 is a sectional view of the mold cup in its open position.

As the plastic material enters the mold cavity formed by the mold recesses 26 and 58, the surface of the plastic material will harden when it contacts the surfaces of the mold members which are at a lower temperature than the plastic material. When the mold cup 12 is at its molding position, as shown in FIG. 5, and the mold cavity is completely filled with the plastic material, the cylinder 54 is actuated to lift the top mold member 22 upwardly and the cylinders 42 are actuated to lower the bottom mold member 20 as shown in FIG. 6. In this open position of the mold cup 12, the bottom and top mold members 20 and 22 are now spaced from the molded preform 90, shown in phantom in FIG. 6. However, the preform 90 is supported on the end of the nozzle 52 and is also mechanically secured to the carrier arm 24 because some of the material of the preform is within the notch 73 in the surface of the opening 70. The pneumatic cylinders 80 are then actuated to move the carrier arm 24 transversely across the bottom and top mold members 20 and 22 thereby shearing the plastic material at the exit point of the nozzle 52 and carrying the preform 90 to an adjacent mold press, not shown. The mold press includes means for holding the preform 90 so that when the cylinders 80 are actuated to move the carrier arm 24 back to its original position, the mechanical connection between the preform 90 and the carrier arm 24 is broken leaving the preform 90 in the mold press. When the carrier arm 24 is retracted to its original position, the mold cup 12 can then be closed to repeat the cycle of molding another preform.

Thus, there is provided by the present invention a molding apparatus 10 which will mold a preform and will automatically transfer the preform to a disc molding press. The molding apparatus 10 has a mold cup 12 which when completely closed collapses to a position where the mold cavity is smaller in volume than the desired volume of the preform being molded. This small volume minimizes swirling action of the plastic material entering the mold cavity so as to minimize or eliminate air bubbles and other defects in the preform being molded. Such a preform is needed to minimize surface defects in the information recording disc being molded with the preform.

We claim:

1. A preform molding apparatus including a mold cup which comprises:
   a pair of mold members mounted with a surface of each opposing a surface of the other, each of said mold members having a concave mold recess in its said opposing surface,
   a carrier arm between said mold members, said carrier arm having an opening therethrough which mates with and compliments the mold recesses in the mold members to form a mold cavity, one of said mold members having at least a portion of a size to fit within the opening in the carrier arm to provide with the other mold member a mold cavity smaller in volume than the volume of the preform to be molded,
   a molding material inlet opening in one of said mold members opening into the bottom of the recess in the said one mold member, and
   means for moving said mold members toward and away from each other and the carrier arm transversely across and away from the mold members.

2. An apparatus in accordance with claim 1 in which one of the mold members has a cylindrical rim extending from around a portion of the edge of the mold recess therein toward the other mold member and the carrier arm has an opening therethrough at an edge thereof which is adapted to extend around the remaining portion of the edge of the recess in the one mold member.

3. An apparatus in accordance with claim 2 in which the other of said mold members has a circular portion which is adapted to fit within the cylindrical rim of the one mold member when the one mold member fits within the opening in the carrier arm so that the mold members can be positioned to form the mold cavity which is smaller in volume than the preform to be molded.

4. An apparatus in accordance with claim 3 in which the carrier arm has a notch on the surface of the opening therethrough which extends around said opening surface.

5. An apparatus in accordance with claim 4 in which the other of said molding members has a rim extending radially outwardly from the edge of its mold recess which rim extends partly around the mold recess and which is adapted to seat against the carrier arm when the mold members and carrier arm are together to form the mold cavity.

6. An apparatus in accordance with claim 5 in which the cylindrical rim on the one mold member is semi-cylindrical, the opening in the carrier arm is semi-cylindrical and the rim on the other mold member is semi-cylindrical.

7. An apparatus in accordance with claim 6 in which the carrier arm is a plate having flat opposed surfaces, and the opening extends through the plate between the opposed surfaces with the diameter of the opening being along one edge of the plate.

8. An apparatus in accordance with claim 7 in which the means for moving the mold members together and the carrier arm transversely across the mold members are separate pneumatic cylinders having piston rods connected to the mold members and carrier area.

9. A preform molding apparatus including a mold cup which comprises:
   a circular top mold member having a concave mold recess in its bottom surface and a semi-cylindrical rim projecting downwardly from around the edge of the recess,
   a circular bottom mold member in vertical alignment with the top mold member and having a concave mold recess in its top surface and a molding material inlet opening into the bottom of the mold recess, said bottom mold member having a portion of a size to fit into the cylindrical rim of the top mold member when the mold members are moved together to a collapsed position in which the mold recesses form together a mold cavity which is smaller in volume than the volume of the preform being molded,
   a carrier arm mounted between said top and bottom mold members, said carrier arm having a semi-cylindrical opening therethrough which is of a size to fit around the top mold member when the mold members are in the collapsed position and which forms with the top mold member rim the center wall of the mold cavity when the mold members are moved apart to a mold position in which the mold cavity is of a volume corresponding to the volume of the preform being molded,
   means for moving said mold members toward and away from each other and means for moving said carrier arm transversely across and away from the mold members.

10. An apparatus in accordance with claim 9 in which the carrier arm has a notch in the surface of the opening therethrough which extends around said opening surface.

11. An apparatus in accordance with claim 10 in which the carrier arm is a plate having flat opposed surfaces and the opening extends through the plate between the opposed surfaces with the diameter of the opening being along one edge of the plate.

12. An apparatus in accordance with claim 11 in which the bottom mold member has a rim extending radially outwardly from the edge of its mold recess which rim extends around one-half of the periphery of the mold recess, said rim is adapted to seat against one of the opposed surfaces of the carrier plate when the mold members and carrier plate are together to form the mold cavity.

13. An apparatus in accordance with claim 12 in which the means for moving the mold members and the carrier are separate pneumatic cylinders having piston rods connected to the mold members and carrier arm.

* * * * *